(12) United States Patent
Becker-Willinger et al.

(10) Patent No.: US 8,388,859 B2
(45) Date of Patent: Mar. 5, 2013

(54) WEAR-RESISTANT OPTICAL LAYERS AND MOULDED BODIES

(75) Inventors: Carsten Becker-Willinger, Saarbruecken (DE); Martin Kluke, Mooreweis (DE); Helmut Schmidt, Saarbruecken-Guedingen (DE)

(73) Assignee: Leibniz-Institut fuer Neue Materialien Gemeinnuetzige GmbH, Saarbruecken (DE)

( * ) Notice: Subject to any disclaimer, the term of this patent is extended or adjusted under 35 U.S.C. 154(b) by 475 days.

(21) Appl. No.: 11/293,185

(22) Filed: Dec. 5, 2005

(65) Prior Publication Data

US 2006/0159923 A1  Jul. 20, 2006

Related U.S. Application Data

(63) Continuation of application No. PCT/EP2004/006325, filed on Jun. 11, 2004.

(30) Foreign Application Priority Data

Jun. 12, 2003 (DE) .................................. 103 26 538

(51) Int. Cl.
- *C09K 3/00* (2006.01)
- *C08L 83/04* (2006.01)
- *C08J 5/00* (2006.01)
- *C08K 3/22* (2006.01)
- *B32B 5/16* (2006.01)

(52) U.S. Cl. ......... 252/182.13; 252/182.11; 252/182.21; 252/182.24; 252/182.28; 252/182.29; 524/262; 524/431; 524/588; 524/790; 523/213; 106/490; 556/418; 556/420; 556/421; 428/412

(58) Field of Classification Search .............. 252/182.13, 252/182.1, 182.21, 182.24, 182.28, 182.26, 252/182.29; 524/262, 431, 588, 790; 523/213; 106/490; 556/418, 420, 421; 428/412

See application file for complete search history.

(56) References Cited

U.S. PATENT DOCUMENTS

| | | | |
|---|---|---|---|
| 193,504 A | 12/1902 | Brueck et al. | |
| 4,618,656 A * | 10/1986 | Kawakubo et al. | 525/404 |
| 5,013,770 A * | 5/1991 | Carpenter et al. | 523/213 |
| 5,107,009 A | 4/1992 | Rauleder et al. | |
| 5,256,706 A * | 10/1993 | Carpenter et al. | 523/213 |
| 5,593,781 A | 1/1997 | Nass et al. | |
| 5,644,014 A | 7/1997 | Schmidt et al. | |
| 5,683,501 A * | 11/1997 | Tomihisa et al. | 106/491 |
| 5,766,680 A | 6/1998 | Schmidt et al. | |
| 5,837,025 A * | 11/1998 | Auchter-Krummel et al. | 65/21.1 |
| 5,910,522 A | 6/1999 | Schmidt et al. | |
| 5,998,504 A * | 12/1999 | Groth et al. | 523/213 |
| 6,020,419 A * | 2/2000 | Bock et al. | 524/590 |
| 6,022,919 A | 2/2000 | Komoto et al. | |
| 6,183,658 B1 * | 2/2001 | Lesniak et al. | 252/62.56 |
| 6,236,493 B1 | 5/2001 | Schmidt et al. | |
| 6,291,070 B1 * | 9/2001 | Arpac et al. | 428/412 |
| 6,403,164 B1 * | 6/2002 | Jonschker et al. | 427/387 |
| 6,630,205 B2 * | 10/2003 | Brueck et al. | 427/387 |
| 6,838,486 B2 * | 1/2005 | Ryang | 516/90 |
| 6,855,396 B1 * | 2/2005 | Mennig et al. | 428/144 |
| 6,955,771 B2 * | 10/2005 | Ryang | 252/389.31 |
| 6,979,466 B2 * | 12/2005 | Lesniak et al. | 424/490 |
| 7,189,768 B2 * | 3/2007 | Baran et al. | 523/200 |
| 2002/0193504 A1 * | 12/2002 | Brueck et al. | 524/588 |
| 2004/0029834 A1 | 2/2004 | Schiestel et al. | |
| 2004/0265233 A1 * | 12/2004 | Holzer et al. | 424/9.32 |
| 2005/0113489 A1 * | 5/2005 | Baran et al. | 523/300 |
| 2006/0084723 A1 | 4/2006 | Hartwig et al. | |

FOREIGN PATENT DOCUMENTS

| | | |
|---|---|---|
| DE | 4025866 | 2/1992 |
| DE | 4212633 | 10/1993 |
| DE | 4417405 | 11/1995 |
| DE | 696 15 304 T2 | 10/1996 |
| DE | 19613645 | 10/1997 |
| DE | 19746885 | 6/1999 |
| DE | 19958336 | 6/2001 |
| DE | 10054248 | 5/2002 |
| DE | 102 41 510 A1 | 3/2004 |
| EP | 0410264 | 1/1991 |
| JP | 7-178335 A | 7/1995 |
| JP | 10-45867 A | 2/1998 |
| WO | 92/21729 | 12/1992 |
| WO | 93/21127 | 10/1993 |
| WO | 95/31413 | 11/1995 |
| WO | 96/31572 | 10/1996 |
| WO | 98/51747 | 11/1998 |
| WO | 01/40394 | 6/2001 |

OTHER PUBLICATIONS

Baumbach, B., et al. "Wässriger Einkomponenten-Polyurethanlack für Glas" FATIPEC Congress 1998, 24, A-405-416.
English language abstract of JP 7-178335.

* cited by examiner

*Primary Examiner* — Joseph D Anthony
(74) *Attorney, Agent, or Firm* — Abel Law Group, LLP.

(57) ABSTRACT

A composition comprising a blocked and/or unblocked isocyanate compound and surface-modified nanoscale solid particles that comprise on the surface thereof organic radicals which comprise groups with an active hydrogen or precursors of such groups.

39 Claims, No Drawings

WEAR-RESISTANT OPTICAL LAYERS AND MOULDED BODIES

CROSS-REFERENCE TO RELATED APPLICATIONS

The present application is a continuation of International Application No. PCT/EP2004/006325, filed Jun. 11, 2004, the entire disclosure whereof is expressly incorporated by reference herein, which claims priority under 35 U.S.C. §119 of German Patent Application 103 26 538.4, filed Jun. 12, 2003.

BACKGROUND OF THE INVENTION

1. Field of the Invention

The present invention relates to compositions which comprise surface-modified nanoscale solid particles with groups having active hydrogen or precursors thereof, preferably hydroxyl groups and/or epoxy groups, and at least one optionally blocked isocyanate compound, and to coatings and molded bodies which are preparable from these compositions and are cured to form urethane bonds or corresponding bonds.

2. Discussion of Background Information

Abrasion-resistant layers with high optical transparency for optical components or high-transparency layers on optical components have become an important field of investigation. Nanocomposite coatings based on sol-gel processes, in which organosilanes are cocondensed together with nanoparticles and form hard layers, have been found to be significant. When silanes which contain polymerizable groups (methacrylates or epoxides) are used, such layers may also be UV-curable and photostructurable. However, the disadvantage of such coatings is the lack of UV stability and also the insufficient scratch resistance associated with high brittleness.

It would therefore desirable to be able to provide coatings or moldings which have high transparency and additionally exhibit high attrition resistance.

SUMMARY OF THE INVENTION

The present invention provides a composition comprising surface-modified nanoscale solid particles and an isocyanate compound and/or a blocked isocyanate compound. The particles comprise on the surface thereof organic radicals that comprise groups having an active hydrogen or precursors of such groups.

In one aspect of the composition, the groups having an active hydrogen or the precursors thereof may comprise one or more of hydroxyl groups, epoxy groups, thiol groups, amino groups, carboxylic groups and carboxylic anhydride groups. For example, they may comprise hydroxyl groups and/or they may comprise epoxy groups.

In another aspect, the nanoscale solid particles may have been surface-modified with a hydrolyzable silane comprising on an non-hydrolyzable substituent thereof at least one group selected from an epoxy group, a hydroxyl group, a thiol group, an amino group, a carboxylic group and a carboxylic anhydride group.

In yet another aspect, the nanoscale solid particles may have been treated with a first surface modifier and subsequently with a second surface modifier which provides organic radicals comprising groups having active hydrogen or a precursor thereof on the surface of the particles.

In a still further aspect of the composition of the present invention, the organic radicals with groups having an active hydrogen or precursors of such groups may comprise organic radicals having hydroxyl groups and/or epoxy groups, and the hydroxyl groups and/or epoxy groups may be derived from a surface modification with one or more of glycidoxypropyltrimethoxysilane, glycidoxypropyltriethoxysilane, 3,4-epoxybutyltri(m)ethoxysilane and 2-(3,4-epoxycyclohexyl)ethyltri-(m)ethoxysilane.

In another aspect of the composition, the nanoscale solid particles may comprise inorganic particles such as, e.g., one or more of metallic, oxidic, sulfidic and semiconductor particles. For example, the nanoscale solid particles may comprise metal oxide particles. The metal oxide may, for example, include one or more of $SiO_2$, $Al_2O_3$, ITO, ATO, AlOOH, $Ta_2O_5$, $ZrO_2$ and $TiO_2$.

In another aspect, the composition may comprise at least one blocked isocyanate compound.

In another aspect, the isocyanate compound and/or blocked isocyanate compound may comprise an organic polyisocyanate compound and/or a blocked organic polyisocyanate compound, for example, a blocked and/or unblocked diisocyanate compound.

In yet another aspect, the isocyanate compound and/or blocked isocyanate compound may comprise blocked and/or unblocked isocyanatosilane and/or a condensate thereof.

In still further aspects, the composition of the present invention may further comprise one or more organic polyols and/or an organically modified inorganic polycondensate and/or a catalyst for a reaction between a group having an active hydrogen and an isocyanate group.

In another aspect of the composition, the organic radicals with groups having an active hydrogen or precursors of such groups may comprise at least two different groups having an active hydrogen and/or precursors of such groups. In yet another aspect, the composition may comprise the nanoscale solid particles, without surface modification, in an amount of from 1% to 40% by weight, for example, in an amount of from 10% to 30% by weight, based on the solids content of the composition.

In another aspect, the molar ratio isocyanate groups/groups having active hydrogen or precursors thereof in the composition may be from 1/9 to 8/2, e.g., from 0.9 to 1.1.

The present invention also provides a composition comprising surface-modified nanoscale solid particles and a blocked and/or unblocked organic diisocyanate compound, and/or a blocked and/or unblocked isocyanatosilane and/or a condensate thereof. The particles comprise on the surface thereof organic radicals that comprise a hydroxy group and/or an epoxy group. The molar ratio (hydroxy+epoxy groups)/(blocked+unblocked isocyanate groups) is from 0.9 to 1.1 and the composition comprises the nanoscale solid particles, without surface modification, in an amount of from 10% to 30% by weight, based on the solids content of the composition.

In one aspect of the composition, the nanoscale solid particles may comprise one or more of $SiO_2$, $Al_2O_3$, ITO, ATO, AlOOH, $Ta_2O_5$, $ZrO_2$ and $TiO_2$. In another aspect, the composition may comprise a blocked isocyanatosilane and/or a condensate thereof.

The present invention also provides a substrate having a coating thereon. The coating is made from the composition of the present invention as set forth above, including the various aspects thereof.

In one aspect, the substrate may be selected from optical components.

In another aspect, the coating may be transparent. In yet another aspect, the substrate may comprise an optical lens.

In a still further aspect, the substrate may comprise one or more of metal, glass, plastic, wood and paper.

The present invention also provides a molded body which is made from the composition of the present invention as set forth above, including the various aspects thereof.

In one aspect, the molded body may comprise an optical component.

The present invention also provides a process for producing a coated substrate. The process comprises applying a composition of the present invention, including the various aspects thereof as set forth above, onto the substrate and curing the coating composition to form bonds between the groups having active hydrogen on the surface of the nanoparticles and the isocyanate groups, provided that when blocked isocyanate groups are present in the composition, at least some of the blocked isocyanate groups are deblocked before and/or during the curing of the composition, and provided that when precursor groups of groups having an active hydrogen are present in the composition, at least some of the precursor groups are converted to groups having an active hydrogen before and/or during the curing of the composition.

In one aspect of the process, one or more of hydroxyl groups, epoxy groups, thiol groups, amino groups, carboxylic groups and carboxylic anhydride groups may be reacted with isocyanate groups to form urethane, thiourethane and/or urea bonds.

The present invention also provides a process for producing a molded body from a composition of the present invention, including the various aspects as set forth above. The process comprises placing the composition in a mold and curing the composition to form bonds between the groups having active hydrogen on the surface of the nanoparticles and the isocyanate groups, provided that when blocked isocyanate groups are present in the composition, at least some of the blocked isocyanate groups are deblocked before and/or during the curing of the composition, and provided that when precursor groups of groups having an active hydrogen are present in the composition, at least some of the precursor groups are converted to groups having an active hydrogen before and/or during the curing of the composition.

In one aspect of the process, one or more of hydroxyl groups, epoxy groups, thiol groups, amino groups, carboxylic groups and carboxylic anhydride groups may be reacted with isocyanate groups to form urethane, thiourethane and/or urea bonds.

The present invention relates to a composition comprising surface-modified nanoscale solid particles which have, on the surface, organic radicals with groups having active hydrogen or a precursor thereof, preferably having hydroxyl groups and/or epoxy groups, and at least one isocyanate whose isocyanate groups may be blocked.

The curing of this composition forms layers or molded bodies of high optical quality which can be employed, for example, for the coating of lenses and other optical molded bodies. Surprisingly, abrasion tests show that such layers, compared to comparable polyurethanes without the nanoscale solid particles used in accordance with the invention, have an abrasion resistance improved by up to 20-fold. For instance, conventional polyurethanes without nanoparticles give rise to an abrasion resistance of about. 40 mg of weight loss according to the standard Taber test, while the inventive nanoparticle-containing polyurethane layers exhibit abrasion resistances of up to 2 mg according to the standard Taber abrader test.

The composition comprises surface-modified nanoscale solid particles. The nanoscale solid particles, also referred to hereinbelow as nanoparticles, may be organic particles, for example made of a plastic, or preferably inorganic nanoparticles. The nanoparticles are preferably made of metal, including metal alloys, metal compounds, in particular metal chalcogenides, more preferably the oxides and sulfides, and semiconductor compounds. It is possible to use one type of nanoscale solid particles or a mixture of different nanoscale solid particles.

Examples of metallic nanoparticles are those made of copper, silver, gold, platinum, palladium, nickel, chromium and titanium, and also alloys comprising these metals, for example (stainless) steel, brass and bronze.

Examples of nanoparticles which can have semiconductor properties are those made of silicon or germanium. In addition, some of the metal compounds below can have semiconductor properties, for example compounds of elements of main groups III and V (e.g. GaAs or InP), of transition group II and of main group VI (e.g. compounds of Zn or Cd with O, S, Se or Te) or mixed oxides (e.g. metal tin oxides such as indium tin oxide (ITO), antimony tin oxide (ATO) or fluorine-doped tin oxide (FTO)). The materials with semiconductor properties are known to those skilled in the art and examples can also be found in the list which follows.

The nanoscale inorganic solid particles may be made of any metal compounds, metal here including silicon and boron. Examples are (optionally hydrated) oxides such as $ZnO$, $CdO$, $SiO_2$, $GeO_2$, $TiO_2$, $ZrO_2$, $CeO_2$, $SnO_2$, $Al_2O_3$ (in particular boehmite, $AlO(OH)$, also in the form of aluminum hydroxide), $B_2O_3$, $In_2O_3$, $La_2O_3$, $Fe_2O_3$, $Fe_3O_4$, $Cu_2O$, $Ta_2O_5$, $Nb_2O_5$, $V_2O_5$, $MoO_3$ or $WO_3$; further chalcogenides, for example sulfides (e.g. $CdS$, $ZnS$, $PbS$ and $Ag_2S$), selenides (e.g. $GaSe$, $CdSe$ and $ZnSe$) and tellurides (e.g. $ZnTe$ or $CdTe$); halides such as $AgCl$, $AgBr$, $AgI$, $CuCl$, $CuBr$, $CdI_2$ and $PbI_2$; carbides such as $CdC_2$ or $SiC$; arsenides such as $AlAs$, $GaAs$ and $GeAs$; antimonides such as $InSb$; nitrides such as $BN$, $AlN$, $Si_3N_4$ and $Ti_3N_4$; phosphides such as $GaP$, $InP$, $Zn_3P_2$ and $Cd_3P_2$; phosphates, silicates, zirconates, aluminates, stannates and the corresponding mixed oxides (luminescent pigments with Y- or Eu-containing compounds, spinels, ferrites or mixed oxides with perovskite structure, such as $BaTiO_3$ and $PbTiO_3$).

The nanoscale inorganic solid particles are preferably an oxide or oxide hydrate of Si, Ge, Al, B, Zn, Cd, Ti, Zr, Ce, Sn, In, La, Fe, Cu, Ta, Nb, V, Mo or W, more preferably of Si, Al, B, Ti and Zr. Particular preference is given to using oxides or oxide hydrates. Preferred nanoscale inorganic solid particles are $SiO_2$, $Al_2O_3$, ITO, ATO, $AlOOH$, $Ta_2O_5$, $ZrO_2$ and $TiO_2$, particular preference being given to $SiO_2$.

These nanoscale particles can be produced in a customary manner, for example by flame pyrolysis, plasma methods, colloid techniques, sol-gel processes, controlled nucleation and growth processes, MOCVD methods and emulsion methods. These processes are described comprehensively in the literature. The sol-gel process is explained in detail below.

The particles may be used in the form of a powder or directly as a dispersion in a dispersant. Examples of dispersions obtainable commercially are the aqueous silica sols from Bayer AG (Levasils®) and also colloidal organosols from Nissan Chemicals (IPA-ST, MA-ST, MEK-ST, MIBK-ST). Obtainable powders are, for example, pyrogenic silicas from Degussa (Aerosil products). Nanoscale solid particles have an average particle diameter (volume average, measurement: when possible, x-ray, otherwise dynamic light scattering (with an ultrafine particle analyzer (UPA))) below 1 µm, generally below 500 nm. The nanoscale solid particles preferably have an average particle diameter of not more than 300 nm, preferably not more than 200 nm and in particular not more than 50 nm, and more than 1 nm and preferably more than 2 nm, for example from 1 to 20 nm. This material may be used in the form of a powder, but it is preferably used in the form of a sol or of a suspension.

The nanoscale solid particles used in accordance with the invention are solid particles modified with organic surface groups, the organic surface groups being groups having active hydrogen or precursors thereof, especially hydroxyl groups and/or epoxy groups. The surface modification of nanoscale solid particles is a known process, as described, for example, by the applicant in WO 93/21127 (DE 4212633), WO 96/31572 or WO 98/51747 (DE 19746885). With regard to the nanoscale solid particles and their surface modification, reference is made to all of these documents.

The production of the surface-modified nanoscale particles can in principle be carried out in two different ways, firstly by surface-modifying already produced nanoscale solid particles and secondly by producing these nanoscale solid particles using one or more compounds which have appropriate moieties for the surface modification. These two routes are illustrated in detail in abovementioned patent applications.

Suitable surface modifiers, especially for the surface modification of already present nanoscale particles, are all (preferably low molecular weight) compounds as surface modifiers which have one or more groups which can react or at least interact with reactive groups present on the surface of the nanoscale solid particles (attachment group), and secondly have at least one group having active hydrogen or a precursor thereof, especially at least one hydroxyl or epoxy group. For example, the surface groups present on nanoparticles are reactive groups as residual valences, such as hydroxyl groups and oxy groups, for example in the case of metal oxides, or thiol groups and thio groups, for example in the case of metal sulfides, or amino, amide and imide groups, for example in the case of nitrides.

The nanoscale particles can be surface-modified, for example, by mixing the nanoscale particles with the suitable surface modifiers illustrated below, if appropriate in a solvent and in the presence of a catalyst. In the case of silanes as surface modifiers, it is sufficient for modification, for example, to stir them with the nanoscale particles at room temperature for several hours. Of course, appropriate conditions, such as temperature, quantitative ratios, duration of reaction, etc., depend upon the specific reactants in each case and the desired degree of coverage.

The surface modifiers can form, for example, either covalent or ionic (salt-like) bonds, or coordinative bonds, to the surface of the nanoscale solid particles, while, among the pure interactions, mention should be made by way of example of dipole-dipole interactions, hydrogen bonds and van der Waals interactions. Preference is given to the formation of covalent, ionic and/or coordinative bonds. A coordinative bond is understood to mean a complex formation. Between the surface modifier and the particle, a Brønsted or Lewis acid/base reaction, a complex formation or an esterification may take place.

It is also preferred in accordance with the invention that the surface modifiers have a relatively low molecular weight. For example, the molecular weight may be less than 1500, in particular below 1000 and preferably below 500 or below 400 or even below 300. This of course does not rule out a distinctly higher molecular weight of the compounds (for example up to 2000 and more). In addition, the surface modifier in particular has a functional group having an active hydrogen or a precursor thereof. It is known that isocyanates can react with groups having active hydrogen. The attachment of the H-active groups or precursors thereof to the nanoparticles by means of the surface modifier enables the crosslinking reaction between nanoparticle and isocyanate in the curing.

The groups having active hydrogen are preferably hydroxyl groups (—OH), thiol groups (—SH), amino groups (—NHR' in which R' may be, for example, H, alkyl, in particular $C_{1-4}$-alkyl, cycloalkyl, e.g. cyclohexanyl, aryl, in particular $C_{6-10}$-aryl such as phenyl and naphthyl, and corresponding aralkyl and alkaryl groups such as tolyl and benzyl), or carboxylic groups (—COOH). The reaction products formed in the reaction with isocyanates are urethanes (in the case of hydroxyl and carboxyl), thiourethanes (in the case of thiol) or ureas (in the case of amine).

A precursor of the group having active hydrogen refers here to a group which can be converted in the composition, before or during the curing, into a group having active hydrogen. Important representatives of these precursors are the epoxy group and the carboxylic anhydride group, which can be converted, for example, by hydrolytic reactions to a hydroxyl group and a carboxyl group respectively. The conversion of the epoxy group to the hydroxyl group is explained in more detail below.

Suitable surface modifiers for preparing the surface modification with organic radicals with a group having active hydrogen or a precursor are surface modifiers having an attachment group for attachment to the nanoparticles, which should of course be selected according to the chemical nature of the nanoparticles. In addition, the surface modifier has, as a functional group, at least one group having active hydrogen or a precursor thereof. The epoxy groups used with particular preference are a precursor which can be converted in the composition to a hydroxyl group, i.e. the epoxy groups can be converted in the composition, before or during the curing, to hydroxyl groups in order to be available for the urethane bond formation which proceeds in the curing step. The conversion can be effected, for example, by hydrolysis. For this purpose, for example, water or other compounds having active hydrogen atoms and, if appropriate, a catalyst (for example an acid or a base) may be present in the composition. The epoxy groups, if present, are converted, especially before the curing or during the curing, to hydroxyl groups which can then react with the isocyanates to form urethane bonds. The conversion of the epoxy groups to hydroxyl groups can take place, for example, directly after surface modification has been performed or only immediately before or during curing, for example after the composition has been applied to a substrate or introduced into a mold. The conversion to hydroxyl groups can be initiated, for example, by heating. Those skilled in the art are familiar with the measures for conversion and can select the conditions such that the conversion takes place at the desired time. The same also applies to other precursors, especially to the anhydride group as a precursor for the carboxyl group.

The attachment groups which the modifier comprises are, for example, carboxylic acid groups, acid chloride groups, ester groups, nitrile and isonitrile groups, OH groups, SH groups, epoxy groups, anhydride groups, amide groups, primary, secondary and tertiary amino groups, Si—OH groups, hydrolyzable silane residues (SiX groups illustrated below) or C—H-acidic moieties, as in β-dicarbonyl compounds. The attachment groups used are, for example, carboxylic acid radicals and especially hydrolyzable groups of silanes, the attachment group of course being selected depending on the nature of the nanoparticles used.

Preferred surface modifiers are hydrolyzable silanes, so that the nanoscale solid particles have preferably been sur-faced modified with hydrolyzable silanes which have, on an unhydrolyzable substituent, a group having active hydrogen or a precursor thereof, preferably an epoxy or hydroxyl group, a thiol group, an amino group or a carboxyl group or carboxylic anhydride group.

Preferred surface modifiers are therefore epoxy silanes and silanes having at least one hydroxyl group. Since the silanes having hydroxyl groups are frequently not very stable, since they tend to condensation via transesterification, preference is given to the use of epoxy silanes. In a preferred embodiment, the organic radicals having hydroxyl or epoxy groups are therefore derived from a surface modification with a silane which has an epoxide group on a non-hydrolyzable substituent.

The silanes are preferably one or more silanes of the general formula $$Rh(R)_b SiX_{(3-b)} \tag{I}$$

where the Rh radical represents a non-hydrolyzable substituent which has an epoxy group or a hydroxyl group, the R radicals are the same or different and are each other non-hydrolyzable substituents, the X radicals are the same or different and are each hydrolyzable groups or hydroxyl groups, and b is 0, 1 or 2. The value b is preferably 0, i.e. the silane is preferably of the formula $RhSiX_3$.

In the general formula (I), the hydrolyzable groups X, which may be the same or different from one another, are, for example, hydrogen, hydroxyl or halogen (F, Cl, Br or I), alkoxy (preferably $C_{1-6}$-alkoxy, for example methoxy, ethoxy, n-propoxy, i-propoxy and butoxy), aryloxy (preferably $C_{6-10}$-aryloxy, for example phenoxy), acyloxy (preferably $C_{1-6}$-acyloxy, for example acetoxy or propionyloxy), alkylcarbonyl (preferably $C_{2-7}$-alkylcarbonyl, for example acetyl), amino, monoalkylamino or dialkylamino having preferably from 1 to 12, in particular from 1 to 6, carbon atoms. Preferred hydrolyzable radicals are halogen, alkoxy groups and acyloxy groups. Particularly preferred hydrolyzable radicals are $C_{1-4}$-alkoxy groups, in particular methoxy and ethoxy.

The non-hydrolyzable radicals R may be non-hydrolyzable radicals R with a functional group or non-hydrolyzable radicals R without such a functional group. As stated, the R radical is preferably not present in these silanes. When it is present, it preferably does not have a functional group.

The non-hydrolyzable radicals R of the formula (I) are, for example, alkyl (e.g. $C_{1-20}$-alkyl, in particular $C_{1-4}$-alkyl, such as methyl, ethyl, n-propyl, i-propyl, n-butyl, i-butyl, sec-butyl and tert-butyl), alkenyl (e.g. $C_{2-20}$-alkenyl, in particular $C_{2-6}$-alkenyl, such as vinyl, 1-propenyl and 2-propenyl), alkynyl (e.g. $C_{2-20}$-alkynyl, in particular $C_{2-4}$-alkynyl, such as acetylenyl or propargyl), aryl (in particular $C_{6-10}$-aryl, such as phenyl and naphthyl) and corresponding aralkyl and alkaryl groups, such as tolyl and benzyl, and cyclic $C_3$-$C_{12}$-alkyl and -alkenyl groups, such as cyclopropyl, cyclopentyl and cyclohexyl. The R and X radicals may each optionally have one or more typical substituents, for example halogen or alkoxy.

The non-hydrolyzable radical R with a functional group may comprise, for example, as a functional group, an ether, dialkylamino, optionally substituted aniline, amide, acryloyl, acryloyloxy, methacryloyl, methacryloyloxy, cyano, alkoxy, aldehyde, alkylcarbonyl and phosphoric acid group. These functional groups are bonded to the silicon atom via alkylene, alkenylene or arylene bridging groups which may be interrupted by oxygen or —NH— groups (H may also be replaced by an alkyl group). The bridging groups contain preferably from 1 to 18, preferably from 1 to 8 and in particular from 1 to 6 carbon atoms.

The divalent bridging groups mentioned and any substituents present, as in the case of the alkylamino groups, are derived, for example, from the above-mentioned monovalent alkyl, alkenyl or aryl radicals. The radical R may of course also have more than one functional group.

The radical Rh is a non-hydrolyzable substituent which has an epoxy group or a hydroxyl group. Rh corresponds to the group R, the functional group being an epoxy or hydroxyl group, so that everything stated above for R applies correspondingly. Preferred examples of non-hydrolyzable radicals Rh with epoxy group are an epoxy- or a glycidyloxy-($C_{1-20}$)-alkyl radical such as β-glycidyloxyethyl, γ-glycidyloxypropyl, δ-glycidyloxybutyl, ε-glycidyloxypentyl, ω-glycidyloxyhexyl, epoxybutyl, epoxypropyl and 2-(3,4-epoxycyclohexyl)ethyl, or a hydroxyl-($C_{1-20}$)-alkyl radical, where the alkyl radical may be interrupted by optionally substituted amino groups. Particular preference is given to γ-glycidyloxypropyl.

Preferred compounds are γ-glycidyloxyalkyltrialkoxysilanes, epoxyalkyltri(m)ethoxysilanes or 2-(3,4-epoxycyclohexyl)alkyltri(m)ethoxy-silanes ((m)ethoxy=methoxy or ethoxy), where the alkyl group may have from 2 to 6 carbon atoms. Specific examples of corresponding silanes are γ-glycidyloxypropyltrimethoxysilane (GPTS), γ-glycidyloxypropyl-triethoxysilane (GPTES), 3,4-epoxybutyltrimethoxysilane, 2-(3,4-epoxycyclohexyl)ethyltrimethoxysilane, hydroxymethyltriethoxysilane, bis(hydroxyethyl)-3-aminopropyltriethoxysilane and N-hydroxyethyl-N-methylaminopropyltriethoxysilane. Silanes of the formula (I) which are particularly suitable in accordance with the invention are γ-glycidyloxypropyltrimethoxysilane (GPTS) and γ-glycidyloxypropyltriethoxysilane (GPTES).

Suitable in a corresponding manner for introducing amino, thio or carboxyl or carboxylic anhydride groups are one or more silanes of the general formula $$Ra(R)_b SiX_{(3-b)} \tag{Ia}$$

in which the radical Ra represents a non-hydrolyzable substituent which has an amino (e.g. above-defined —NHR' group), thio or carboxyl or carboxylic anhydride group, and R, X and b are each as defined in formula (I). Ra corresponds to the R group of formula (I), the functional group being an amino, thio or carboxyl or carboxylic anhydride group, so that everything stated for R in formula (I) applies correspondingly.

Specific examples of aminosilanes are 3-aminopropyltriethoxysilane, 3-aminopropyltrimethoxysilane, N-2-aminoethyl-3-aminopropyltrimethoxysilane, trimethoxysilylpropyldiethylenetriamine, N-(6-aminohexyl)-3-aminopropyltrimethoxysilane, 4-aminobutyltriethoxysilane, (aminoethylaminomethyl)-phenylethyltrimethoxysilane and aminophenyltrimethoxysilane.

Specific examples of thiosilanes (mercaptosilanes) are 3-mercaptopropyltrimethoxysilane, 3-mercaptopropyltriethoxysilane, 3-mercaptopropylmethyldimethoxysilane, 2-mercaptoethyltriethoxysilane, 1,2-dimercaptoethyltrimethoxysilane and p-mercaptophenyltrimethoxysilane. Further examples can be found, for example, in DE-A-40 25 866, to which reference is made here.

The anhydride groups may be radicals which are derived from carboxylic anhydrides such as succinic anhydride, maleic anhydride or phthalic anhydride, which are bonded to the silicon atom via one of the aforementioned radicals, especially $C_1$-$C_4$-alkylene. Examples are [3-(triethoxysilyl)-propyl]succinic anhydride, (dihydro-3-(3-triethoxysilyl)propyl)-2,5-furandione and [3-(trimethoxysilyl)propyl]succinic anhydride.

Further examples and definitions of epoxysilanes, aminosilanes, mercaptosilanes and carboxylsilanes or carboxylic anhydride silanes can be found, for example, in DE-A-100 54 248 or WO 01/40394 (DE-A-199 58 336), to which reference is made.

The organic radicals with groups having active hydrogen or a precursor thereof contain at least one group with active hydrogen or a precursor thereof; in a preferred embodiment, the surface modification gives rise to organic radicals which contain more than one group having active hydrogen or precursor thereof. Such organic radicals with at least two groups having active hydrogen arise when, for example, an epoxysilane is condensed onto the nanoparticle with one hydrolyzable radical and condensed with a second epoxysilane with a further hydrolyzable radical. This reaction can advance further, so that two or more epoxy groups or, after conversion, two or more hydroxyl groups are obtained on one organic radical. In this context, it is also possible in this preferred embodiment to refer to polyol, polythiol, polyamine or polycarboxyl radicals or precursors thereof on the nanoparticles. Of course, it is also possible to use surface modifiers with two different functional groups or mixtures of different surface modifiers, so that nanoparticles with different groups having active hydrogen are the result, for example organic radicals with amino and hydroxyl groups.

In an alternative embodiment, the nanoparticles can be subjected first to a first surface modification which forms new functional groups on the surface of the nanoparticles, by means of which the organic radicals with groups having active hydrogen or the precursors thereof can be attached with a second surface modifier. In this way, the groups having active hydrogen or the precursors thereof, especially the hydroxyl or epoxy groups, are applied indirectly to the nanoparticles and a two-layer structure is obtained. This additional procedure enables higher variability. It is thus possible, for example, to attach surface modifiers with groups having active hydrogen or precursors thereof, said surface modifiers not having an attachment group for the unmodified nanoparticle of specific interest but being attachable via the functional group applied with the first surface modifier. For example, it is possible to introduce a carboxylic acid group as a functional group to the surface with a first surface modifier and it can then react with a polyol as a second surface modifier.

The surface modification with the first and the second surface modifier is effected in precisely the same way as the direct surface modification described above, so that everything stated above applies correspondingly. The (second) surface modifier with the group having active hydrogen is one described above. Suitable first surface modifiers are bifunctional compounds, one of whose functional groups can serve as an attachment group to the nanoparticle and whose second functional group serves for attachment of the second surface modifier. Examples of suitable attachment groups, molecular weights and attachment types to the nanoparticles are identical to those above for the surface modifier for surface modification with organic radicals with groups having active hydrogen or precursors thereof. The functional group may also be selected from the groups described for the attachment group, functional group and attachment group being the same or different.

Examples of the first surface modifier used in the alternative embodiment are the modifiers already described for the direct attachment, but it is of course also possible to use surface modifiers which do not have, as a functional group, a group having active hydrogen or a precursor thereof. Examples thereof are unsaturated carboxylic acids, β-dicarbonyl compounds, for example β-diketones or β-carbonyl-carboxylic acids, ethylenically unsaturated amines or amines with a further functional group, such as amino acids. These modifiers and those which follow may of course also be used for direct attachment of the groups having active hydrogen or of the precursors when they contain these groups.

Examples of compounds which are used for surface modification are saturated or unsaturated mono- and polycarboxylic acids, for example having from 1 to 12 carbon atoms (e.g. acrylic acid, methacrylic acid, crotonic acid, citric acid, adipic acid, succinic acid, glutaric acid, oxalic acid, maleic acid and fumaric acid) and also their anhydrides, esters (preferably $C_1$-$C_4$-alkyl esters) and amides.

Examples of further suitable surface modifiers are quaternary ammonium salts of the formula $NR^1R^2R^3R^{4+}X^-$ in which $R^1$ to $R^4$ are each identical or different, aliphatic, aromatic or cycloaliphatic groups having preferably from 1 to 12, in particular from 1 to 8 carbon atoms, for example alkyl groups having from 1 to 12, in particular from 1 to 8 and more preferably from 1 to 6 carbon atoms (e.g. methyl, ethyl, n- and i-propyl, butyl or hexyl), and $X^-$ is an inorganic or organic anion, e.g. acetate, $OH^-$, $Cl^-$, $Br^-$ or $I^-$; mono- and polyamines, especially those of the general formula $R'_{3-n}NH_n$ in which n=0, 1 or 2, and the R' radicals are each independently alkyl groups having from 1 to 12, in particular from 1 to 8 and more preferably from 1 to 6 carbon atoms (e.g. methyl, ethyl, n- and i-propyl, butyl or hexyl) and ethylenepolyamines (e.g. ethylenediamine, diethylenetriamine, etc.); amino acids; imines; β-dicarbonyl compounds having from 4 to 12, in particular from 5 to 8 carbon atoms, for example acetylacetone, 2,4-hexanedione, 3,5-heptanedione, acetoacetic acid and $C_1$-$C_4$-alkyl acetoacetates; and silanes, for example the hydrolyzable silanes having at least one non-hydrolyzable group of the above formula (I) or of the formulae (II) and (III) illustrated below, where a non-hydrolyzable radical comprises a functional group.

The composition also comprises an isocyanate. The isocyanate may be a conventional isocyanate known to those skilled in the art. The isocyanate may have one, two or more isocyanate groups; preferably it has at least two isocyanate groups. The isocyanate may, for example, be aliphatic, alicyclic, aromatic or heterocyclic, monocyclic or polycyclic.

The isocyanate serves to crosslink the surface-modified nanoparticles. The isocyanate is preferably used in blocked form in order to prevent an uncontrolled, rapid reaction from setting in. Selective deblocking, for example by heating, can be used to carry out selective crosslinking of the group having active H, for example of the hydroxyl function, with the isocyanate function to give a polyurethane.

The blocking of the isocyanates is a method, known to those skilled in the art, for reversibly lowering the reactivity of isocyanates. To block the isocyanates, all common blocking agents are useful, for example acetone oxime, cyclohexanone oxime, methyl ethyl ketoxime, acetophenone oxime, benzophenone oxime, 3,5-dimethylpyrazole, 1,2,4-triazole, ethyl malonate, ethyl acetoacetate, ε-caprolactam, phenol, ethanol, preference being given in accordance with the invention to 1,2,4-triazole. The blocking can be effected without solvent by melting the blocking agent and adding the isocyanate, but also with solvent at room temperature with addition of a catalyst. Aprotic solvents which are suitable for this purpose are, for example, acetone, dioxane, ethyl acetate, butyl acetate or toluene.

The isocyanates may be isocyanatosilanes or customary organic polyisocyanates. They are preferably isocyanatosilanes. The isocyanatosilanes are in particular hydrolyzable silanes which have an isocyanate group on a non-hydrolyzable radical, or condensates thereof. When monomeric isocyanatosilanes are used, it is possible for bi- or polyfunctional condensates to form in situ in the composition.

The isocyanatosilanes too are preferably used in blocked form. The condensates are preferably prepared from the monomeric isocyanatosilanes by the sol-gel process described above. It is frequently sensible or necessary actually to block the starting monomers in order to prevent side reactions from occurring in the condensate formation.

The isocyanatosilanes are preferably one or more silanes of the general formula

in which the radical Ri represents a non-hydrolyzable substituent which has an isocyanate group, the R radicals are the same or different and are other non-hydrolyzable substituents, the radicals X are the same or different and are hydrolyzable groups or hydroxyl groups, and b is 0, 1 or 2, or condensates based on these isocyanatosilanes. The substituents R and X are each as defined in formula (I), where R is preferably a non-hydrolyzable substituent without functional group and is more preferably an alkyl group having from 1 to 10 carbon atoms, and X is preferably an alkoxy group having from 1 to 10 carbon atoms, preferably methoxy or ethoxy.

Ri corresponds to the group R, the functional group being an isocyanate group, so that everything stated above for R applies correspondingly.

Preferred examples of non-hydrolyzable radicals Ri with isocyanate group are an isocyanato-$(C_{1-12})$-alkyl radical, e.g. a 3-isocyanatopropyl radical. Specific examples of corresponding silanes are 3-isocyanatopropyltri(m)ethoxysilane and 3-isocyanatopropyldimethylchlorosilane.

The organic isocyanates may be customary polyisocyanates, for example monomeric polyisocyanates, polyisocyanate adducts, so-called modified polyisocyanates or mixtures thereof. The polyisocyanates preferably contain at least 2 isocyanate groups. These are known to those skilled in the art and are commercially available and are described, for example, in G. Oertel, Polyurethane Handbook, Hanser-Verlag 1993 and in "Methoden der organischen Chemie" [Methods of organic chemistry] (Houben-Weyl), vol. 14/2, Thieme Verlag, 1963. The adducts may, for example, have an average NCO functionality of from 2 to 6, preferably from 2.4 to 4. Mixtures of monomeric polyisocyanates and polyisocyanate adducts give rise to an average functionality which may also be within the above-described range.

The polyisocyanate adducts are, for example, those which typically find use as hardeners for two-component urethane coatings and are described in "Lackharze: Chemie, Eigenschaften und Anwendungen" [Coating resins: chemistry, properties and applications], Eds D. Stoye, W. Freitag, Hanser Verlag Munich, Vienna, 1996. These polyisocyanate adducts preferably contain isocyanurate, biuret, allophanate and/or uretdione groups and have average NCO functionalities of, for example, from 2 to 6, and also an NCO content of, for example, from 5 to 30% by weight. In addition, the polyisocyanates may contain monomeric polyisocyanates and/or other polyisocyanate adducts, for example with urethane, carbodiimide and/or iminoxadiazinedione structures. They may, for example, by trimers (isocyanurates) of hexamethylene 1,6-diisocyanate having an average NCO functionality of from 3 to 4 and an NCO content of from 15 to 25% by weight.

The monomeric polyisocyanates are isocyanates which contain two or more isocyanate groups, preferably those which contain two isocyanate groups. Examples of monomeric isocyanates which contain three or more isocyanate groups are 4-isocyanatomethyloctane 1,8-diisocyanate and aromatic polyisocyanates such as triphenylmethane 4,4',4''-triisocyanate or polyphenyl-polymethylene polyisocyanates.

Monomeric isocyanates which contain two isocyanate groups are represented generally by the general formula $Z(NCO)_2$ where Z is a divalent organic radical which has, for example, a molecular weight of from 50 to 1000, preferably from 70 to 320. Preference is given to diisocyanates in which Z is a divalent $C_4$-$C_{40}$ hydrocarbon radical, preferably a divalent aliphatic $C_4$-$C_{18}$ radical, a divalent cycloaliphatic $C_4$-$C_{15}$ radical, a divalent araliphatic $C_7$-$C_{15}$ radical or a divalent aromatic $C_6$-$C_{15}$ radical.

Examples of suitable isocyanates are the diisocyanates known from polyurethane chemistry, for example 1,3-diisocyanatobenzene, tolylene 2,4- and 2,6-diisocyanate (TDI), hexamethylene 1,6-diisocyanate (HMDI), diphenylmethane 4,4'- and 2,4-diisocyanate (MDI), naphthylene diisocyanate, xylylene diisocyanate, isophorone diisocyanate, paraphenyl diisocyanate, dicyclohexylmethane diisocyanate, cyclohexyl diisocyanate, polymethylpolyphenyl isocyanate, dodecamethylene 1,6-diisocyanate, 1,4-bis(isocyanatocyclohexyl) methane, pentamethylene diisocyanate, trimethylene diisocyanate, triphenylmethane diisocyanate, and also the higher molecular weight polyisocyanates derived from these diisocyanates, for example based on isocyanurate, uretdione, allophanate and biuret. The isocyanates are obtainable, for example, under the trade names Desmodur® and Baymidur® (from Bayer), CARADATE® (from Shell), TEDIMON® (from Enichem) and LUPRANAT® (from BASF).

The nanoparticles (without surface modification) may be present in the composition in a proportion of from 1 to 40% by weight, preferably from 10 to 30% by weight, based on the solids content of the composition. The nanoparticle/surface modifier weight ratio is generally from 1:1 to 1:7, preferably from 1:1 to 1:2. The molar ratio of (optionally blocked) isocyanate groups/group having active hydrogen (in particular hydroxyl groups) is generally, for example, from 1/9 to 8/2; the ratio is preferably selected such that a roughly stoichiometric ratio exists with regard to the reactive groups (NCO/active H, e.g. NCO/OH, approx. 1, for example between 0.9 and 1.1).

The composition may comprise further additives which are typically added in industry to coating compositions or compositions for moldings depending on the purpose and desired properties. Specific examples are thixotropic agents, solvents or dispersants, other matrix-forming components, polyols, organic and inorganic color pigments, including in the nanoscale range, metal colloids, for example as carriers of optical functions, dyes, UV absorbers, lubricants, leveling agents, wetting agents, adhesion promoters and catalysts.

The solvents (dispersants) used may, for example, be solvents customary for coatings. A particularly preferred solvent is water, especially deionized water. Suitable organic solvents are both polar and nonpolar and aprotic solvents. Examples thereof are alcohols, preferably lower aliphatic alcohols ($C_1$-$C_8$ alcohols), such as methanol, ethanol, 1-propanol, i-propanol and 1-butanol, ketones, preferably aliphatic ketones, such as acetone, methyl ethyl ketone and methyl isobutyl ketone, esters such as 2-methoxypropyl acetate, butyl acetate and ethyl acetate, ethers, preferably lower dialkyl ethers, such as diethyl ether, cyclic ethers such as dioxane or THF, or monoethers of diols, such as ethylene glycol or propylene glycol, with $C_1$-$C_8$ alcohols, aromatic or aliphatic hydrocarbons such as hexane, heptane, petroleum ether, toluene and xylene, amides such as dimethylformamide, and mixtures thereof. Protic solvents should have a boiling point below the deblocking temperature of the blocked isocyanate in order to minimize side reactions. Examples are aliphatic alcohols having from 1 to 4 carbon atoms.

It is also possible to add organic polyols which may take on a portion of the crosslinking with the isocyanates, so that properties (for example flexibility) of the resulting layers or moldings can be adjusted directly. The polyols increase the organic fraction in the composition. Their use may also be economically advantageous. The polyol compounds used may be simple diols, triols and higher alcohols. They may, for example, be aliphatic, cycloaliphatic or aromatic. Examples of usable polyols are, for example, ethylene glycol, diethylene glycol, 1,2-, 1,3- and 1,4-butanediol, 1,5- and 2,4-pentanediol, 1,6- and 2,5-hexanediol, 1,4-cyclohexanediol, glycerol, trimethylolethane, trimethylolpropane, 2,2-bis(4-hydroxyphenylpropane) (bisphenol A), trishydroxyphenylethane, pentaerythritol and polyethylene glycol.

The composition may comprise catalysts for the urethane formation reaction or the corresponding reactions. Examples are tin compounds known from polyurethane chemistry (e.g. dibutyltin dilaurate, dibutyltin diacetate, tin octoate) or amines (e.g. triethylamine, quinuclidine, DABCO).

The composition may additionally comprise an organically modified inorganic or purely inorganic polycondensate or precursor thereof as a matrix-forming component. In that case, compositions are obtained which, after the curing, give rise to a matrix of an organically modified inorganic or purely inorganic polycondensate with nanoscale solid particles crosslinked via the polyisocyanate component contained therein (nanomer composite).

The organically modified inorganic or purely inorganic polycondensates may be obtained by hydrolysis and condensation of hydrolyzable starting compounds by the sol-gel process. This can be done before addition of the further component of the composition or in situ in the presence of one or more components of the composition.

The organically modified inorganic polycondensates or precursors thereof preferably comprise polyorganosiloxanes or precursors thereof. The organically modified inorganic polycondensates or precursors thereof may also contain organic radicals with functional groups. Coating compositions based on organically modified inorganic polycondensates are described, for example, in DE 19613645, WO 92/21729 and WO 98/51747, which are fully incorporated herein by reference.

The organically modified inorganic polycondensates or precursors thereof are prepared preferably by hydrolysis and condensation of hydrolyzable starting compounds by the sol-gel process. Precursors refer in particular to prehydrolyzates and/or precondensates of the hydrolyzable starting compounds with low degree of condensation. In the sol-gel process, the hydrolyzable compounds are hydrolyzed with water, optionally by heating or acidic or basic catalysis, and partly condensed. It is possible to use stoichiometric amounts of water, but also smaller or greater amounts. The sol which forms may be adjusted to the viscosity desired for the composition by suitable parameters, for example degree of condensation, solvent or pH. Further details of the sol-gel process are described, for example, in C. J. Brinker, G. W. Scherer: "Sol-Gel Science—The Physics and Chemistry of Sol-Gel Processing", Academic Press, Boston, San Diego, New York, Sydney (1990).

The hydrolyzable starting compounds are compounds having hydrolyzable groups, at least a portion, for example at least 10%, of these compounds appropriately also comprising non-hydrolyzable groups. When no compounds having non-hydrolyzable groups are used, purely inorganic polycondensates are obtained. In principle, silanes without isocyanate groups may be condensed together with the isocyanatosilanes described above, so that modified isocyanatosilane condensates are obtained.

The hydrolyzable starting compounds having at least one non-hydrolyzable group which are used are preferably hydrolyzable organosilanes or oligomers thereof. It may accordingly be a polycondensate obtainable, for example, by the sol-gel process, or precursors thereof, based on one or more silanes of the general formula

$$R_aSiX_{(4-a)} \quad (III)$$

in which the radicals R are the same or different and represent non-hydrolyzable groups, the radicals X are the same or different and are hydrolyzable groups or hydroxyl groups, and a is 1, 2 or 3, or an oligomer derived therefrom a is preferably 1. The radicals R and X are as defined above in the formulae (I) and (II). The non-hydrolyzable radicals R, which may be the same or different from one another, may be non-hydrolyzable radicals R with a functional group or preferably non-hydrolyzable radicals R without such a functional group.

It is also possible to use organically modified inorganic polycondensates or precursors thereof which have at least partly organic radicals which are substituted by fluorine. Such silanes are described in detail in WO 92/21729. For this purpose, it is possible preferably to use hydrolyzable silane compounds with at least one non-hydrolyzable radical, which have the general formula

$$Rf(R)_bSiX_{(3-b)} \quad (IV)$$

in which X and R are each as defined in formula (I), Rf is an non-hydrolyzable group which has from 1 to 30 fluorine atoms bonded to carbon atoms which are preferably separated from Si by at least two atoms, preferably an ethylene group, and b is 0, 1 or 2. R is in particular a radical without a functional group, preferably an alkyl group such as methyl or ethyl.

Among the hydrolyzable starting compounds used to prepare the organically modified inorganic polycondensates or precursors thereof, it is optionally also possible to partly use compounds without a non-hydrolyzable group. These are in particular compounds of glass- or ceramic-forming elements, in particular compounds of at least one metal M from main groups III to V, in particular III and IV, and/or transition groups II to V of the Periodic Table of the Elements. They are preferably hydrolyzable compounds of Si, Al, B, Sn, Ti, Zr, V or Zn, in particular those of Si, Al, Ti or Zr, or mixtures of two or more of these metals. It is also possible to use, in small amounts (not more than 40 mol % and in particular not more than 20 mol % of the polycondensate) of the other hydrolyzable monomeric compounds used overall, other hydrolyzable compounds, especially those of elements of main groups I and II of the Periodic Table (e.g. Na, K, Ca and Mg) and of transition groups V to VIII of the Periodic Table (e.g. Mn, Cr, Fe and Ni). It is also possible to use hydrolyzable compounds of the lanthanides. When highly reactive hydrolyzable compounds are used (for example aluminum compounds), it is recommended to use complexing agents which prevent spontaneous precipitation of the corresponding hydrolyzates after addition of water. WO 92/21729 specifies suitable complexing agents which can be used in the case of reactive hydrolyzable compounds. When only hydrolyzable compounds without non-hydrolyzable radicals are used, the result is purely inorganic condensates.

These compounds in particular have the general formula $MX_n$ in which M is the metal defined above, X is as defined in formula (I), it being possible for two X groups to be replaced by one oxo group, and n corresponds to the valency of the element and is usually 3 or 4. Preference is given to alkoxides of Si, Zr and Ti. Compositions based on hydrolyzable compounds with non-hydrolyzable groups and hydrolyzable compounds without non-hydrolyzable groups are described, for example, in WO 95/31413 (DE 4417405), to which reference is hereby made.

Suitable additional or single compounds without non-hydrolyzable groups are in particular hydrolyzable silanes which have, for example, the formula $$SiX_4 \qquad (V)$$

where X is as defined in formula (I). Specific examples are $Si(OCH_3)_4$, $Si(OC_2H_5)_4$, $Si(O-n-$ or $i-C_3H_7)_4$, $Si(OC_4H_9)_4$, $SiCl_4$, $HSiCl_3$, $Si(OOCC_3H)_4$. Of these silanes, preference is given in particular to tetramethoxysilane and tetraethoxysilane. Frequently, preference is given to polycondensates based on a silane of the formula (III), in particular on an alkyl trialkoxysilane, and on a silane of the formula (V).

Examples of usable hydrolyzable compounds of other metals M are $Al(OCH_3)_3$, $Al(OC_2H_5)_3$, $Al(O-n-C_3H_7)_3$, $Al(O-i-C_3H_7)_3$, $Al(OC_4H_9)_3$, $AlCl_3$, $AlCl(OH)_2$, $Al(OC_2H_4OC_4H_9)_3$, $TiCl_4$, $Ti(OC_2H_5)_4$, $Ti(O-n-C_3H_7)_4$, $Ti(O-i-C_3H_7)_4$, $Ti(OC_4H_9)_4$, $Ti(2\text{-ethylhexoxy})_4$, $ZrCl_4$, $Zr(OC_2H_5)_4$, $Zr(O-n-C_3H_7)_4$, $Zr(O-i-C_3H_7)_4$, $Zr(OC_4H_9)_4$, $ZrOCl_2$, $Zr(2\text{-ethyl-hexoxy})_4$ and Zr compounds which have complexing radicals, for example β-diketone and (meth)acryloyl radicals, $BCl_3$, $B(OCH_3)_3$, $B(OC_2H_5)_3$, $SnCl_4$, $Sn(OCH_3)_4$, $Sn(OC_2H_5)_4$, $VOCl_3$ and $VO(OCH_3)_3$.

The compositions are preferably used as coatings. When the composition is used as a coating composition, all customary materials may be coated. Examples of a suitable substrate are substrates made of metal, semiconductor, glass, ceramic, glass-ceramic, plastic, wood, paper or inorganic-organic composite materials. In the case of high-temperature-curing compositions, temperature-stable substrates (stable at at least 130° C. for at least 15 min) are appropriately used, for example metals, glass, ceramic or heat-resistant plastics.

Examples of metal substrates include, for example, copper, aluminum, brass, iron, steel and zinc. Examples of semiconductors are silicon, for example in the form of wafers, and indium tin oxide layers (ITO layers) on glass. The glass used may be all conventional types of glass, for example silica glass, borosilicate glass or soda-lime silicate glass. Examples of plastic substrates are polycarbonate, polymethyl methacrylate, polyacrylates, polyethylene terephthalate. Especially for optical or optoelectronic applications, suitable substrates are transparent substrates, for example made of glass or plastic. The substrates may be pretreated, for example by cleaning, by a corona treatment or with a preliminary coating (for example a lacquer or a metallized surface).

The composition may be applied to the substrate in any suitable way. It is possible to use all common wet-chemical coating processes. Examples are spin-coating dip-(electro) coating, knife-coating, spraying, squirting, casting, painting, flow-coating, knife-casting, slot-coating, meniscus-coating, curtain-coating and roll application.

The molded bodies or coated substrates are obtained by a) mixing the surface-modified nanoparticles with the isocyanates, additives described above optionally being added to the composition, b) applying the composition to a substrate or introducing it into a mold, and c) curing to form the urethane, thiourethane or urea crosslinking, a deblocking of the isocyanates being effected before or during the curing when blocked isocyanates are used, and epoxy groups or carboxylic anhydride groups being converted to hydroxyl groups and carboxyl groups respectively when the surface-modified nanoparticles contain epoxy groups or carboxylic anhydride groups.

The deblocking, the conversion and the curing (crosslinking to form urethane bonds, etc.) may be effected in a customary manner, for example by irradiating or heating. The necessary energy input depends of course upon the specific compounds used in each case and any catalysts present. In general, preference is given to thermal curing (for example at over 100° C., preferably over 130° C.).

In the course of the curing step, it is also possible to effect the deblocking and conversion steps which may be required. These may also take place before the curing step. For example, the hydrolysis of the epoxides or of the anhydrides, if appropriate with addition of a catalyst, can be effected at a lower temperature which is not sufficient for the curing. When unblocked isocyanates are used, milder conditions for the curing are possible. In the curing, crosslinking is effected by forming bonds, especially urethane, thiourethane or urea bonds, between the nanoparticles and the isocyanates.

Owing to their high transparency and attrition resistance, the resulting coatings and moldings are especially suitable for optical applications. They may be used, for example, as optical components or transparent layers on optical components. A particularly suitable field of use is that of coatings of lenses.

DETAILED DESCRIPTION OF THE INVENTION

The example which follows serves to further illustrate the present invention.

EXAMPLE

In the example, $SiO_2$ nanoparticles modified with 3-glycidoxypropyltriethoxysilane (GPTES) are reacted with a blocked isocyanate. The blocked isocyanate is obtained by reacting 3-isocyanatopropyltriethoxysilane (ICPTES) with 1,2,4-triazole. The blocking agent is used in a slightly superstoichiometric amount in order to ensure full conversion (1:1.1). 1,2,4-Triazole is initially charged under nitrogen atmosphere and melted at an oil bath temperature of 135° C. ICPTES is added slowly via a dropping funnel. The reaction time is 6 hours. The reaction is monitored by IR spectroscopy by means of the isocyanate band. 1.25 g of Levasil® 200S/30 (Bayer AG, 30% colloidal solution of silicon dioxide in water) is added with vigorous stirring to 2.5 g of 3-glycidoxypropyltriethoxysilane (9 mmol). The suspension is stirred for 24 h. Subsequently, 2.84 g of the triazole-blocked ICPTES (9 mmol) is prehydrolyzed with 0.24 g of 0.1 N hydrochloric acid for 30 minutes and added to the suspension. 2.7 g of demineralized water is added to this mixture, so that the solids content of the sol is 39.6%. The theoretical $SiO_2$ content in the solid state is 10 percent by weight. The coating material is applied to an aluminum sheet by means of spin-coating technology and precured at 100° C. for 10 minutes, and is then fully cured at 180° C. for 30 minutes. The coatings were firm and transparent; the layer thickness was 10 μm. The mechanical characteristics of coatings with from 0 to 40 percent by weight of $SiO_2$ in the solid state were determined with the aid of microhardness and Taber abrader tests (load per roll: 500 g, CS-10F rolls, 1000 cycles). The layer thicknesses were 10-11 μm. The mechanical properties were improved with increasing $SiO_2$ content (Tab. 1).

TABLE 1

Variation in the mechanical properties with increasing SiO$_2$ content

| System | SiO$_2$ content (% by wt. in the solid state) | HU [N/mm$^2$] | W$_e$ [%] | HU$_{plast}$ [N/mm$^2$] | Modulus of elasticity [GPa] | Taber abrader weight loss [mg] |
|---|---|---|---|---|---|---|
| I | 0 | 202 | 73 | 345 | 4.6 | 2.5 |
| I-10 | 10 | 320 | 70 | 543 | 6.9 | 1.2 |
| I-20 | 20 | 326 | 67 | 591 | 7.4 | 1.2 |
| I-30 | 30 | 370 | 67 | 701 | 7.6 | 1.3 |
| I-40 | 40 | 440 | 65 | 818 | 9.2 | 1.7 |

The systems feature excellent mechanical strength; conventional urethane systems based on IPDI have weight losses of around 40 mg in the Taber abrader test (literature: Baumbach, B., Dearth, M., Küttner, R. S., Noble, K. L., FATIPEC Congress 1998, 24, A-405).

What is claimed is:

1. A curable composition comprising surface-modified nanoscale solid particles, wherein the particles comprise on a surface thereof polycondensates of one or more hydrolyzable silanes which comprise groups having an active hydrogen or precursors of such groups, and wherein the composition further comprises at least one of a blocked or unblocked isocyanatosilane and a condensate thereof for crosslinking the particles upon curing of the composition.

2. The composition of claim 1, wherein the groups having an active hydrogen or the precursors thereof comprise one or more of hydroxyl groups, epoxy groups, thiol groups, amino groups, carboxylic groups and carboxylic anhydride groups.

3. The composition of claim 1, wherein the polycondensates comprise hydroxyl groups.

4. The composition of claim 1, wherein the polycondensates comprise epoxy groups.

5. The composition of claim 1, wherein the nanoscale solid particles have been surface-modified with a polycondensate of a hydrolyzable silane comprising on an non-hydrolyzable substituent thereof at least one group selected from an epoxy group, a hydroxyl group, a thiol group, an amino group, a carboxylic group and a carboxylic anhydride group.

6. The composition of claim 1, wherein the nanoscale solid particles have been treated with a first surface modifier and subsequently with a second surface modifier which provides polycondensates comprising groups having active hydrogen or a precursor thereof on the surface of the particles.

7. The composition of claim 1, wherein the polycondensates with groups having an active hydrogen or precursors of such groups comprise polycondensates having at least one of hydroxyl groups and epoxy groups, the at least one of hydroxyl groups and epoxy groups being derived from one or more of glycidoxypropyltrimethoxysilane, glycidoxypropyltriethoxysilane, 3,4-epoxy-butyltri(m)ethoxysilane and 2-(3,4-epoxycyclohexyl)ethyltri(m)ethoxysilane.

8. The composition of claim 1, wherein the nanoscale solid particles comprise inorganic particles.

9. The composition of claim 8, wherein the nanoscale solid particles comprise one or more of metallic, oxidic, sulfidic and semiconductor particles.

10. The composition of claim 1, wherein the nanoscale solid particles comprise metal oxide particles.

11. The composition of claim 10, wherein the nanoscale solid particles comprise one or more of SiO$_2$, Al$_2$O$_3$, ITO, ATO, AlOOH, Ta$_2$O$_5$, ZrO$_2$ and TiO$_2$.

12. The composition of claim 1, wherein the composition comprises at least one of a blocked isocyanatosilane and a condensate thereof.

13. The composition of claim 1, wherein the composition further comprises one or more organic polyols.

14. The composition of claim 1, wherein the composition further comprises an organically modified inorganic polycondensate which is not linked to the nanoscale solid particles.

15. The composition of claim 1, wherein the composition further comprises a catalyst for a reaction between a group having an active hydrogen and an isocyanate group.

16. The composition of claim 1, wherein the polycondensates with groups having an active hydrogen or precursors of such groups comprise at least two different groups having an active hydrogen or precursors of such groups.

17. The composition of claim 1, wherein the composition comprises the nanoscale solid particles, without surface modification, in an amount of from 1% to 40% by weight, based on a solids content of the composition.

18. The composition of claim 11, wherein the composition comprises the nanoscale solid particles, without surface modification, in an amount of from 10% to 30% by weight, based on a solids content of the composition.

19. The composition of claim 18, wherein a molar ratio isocyanate groups/groups having active hydrogen or precursors thereof is from 1/9 to 8/2.

20. The composition of claim 19, wherein the molar ratio is from 0.9 to 1.1.

21. A substrate having a coating thereon, wherein the coating is made from the composition of claim 1.

22. The substrate of claim 21, wherein the substrate is selected from optical components.

23. The substrate of claim 22, wherein the coating is transparent.

24. The substrate of claim 23, wherein the substrate comprises an optical lens.

25. The substrate of claim 21, wherein the substrate comprises at least one of metal, glass, plastic, wood and paper.

26. A molded body which is made from the composition of claim 1.

27. The molded body of claim 26, wherein the molded body comprises an optical component.

28. A curable composition comprising surface-modified nanoscale solid particles, wherein the particles comprise on a surface thereof polycondensates of one or more hydrolyzable silanes which comprise at least one of a hydroxy group and an epoxy group and wherein the composition further comprises at least one of a blocked or unblocked isocyanatosilane and a condensate thereof for crosslinking the particles upon curing of the composition, a molar ratio (hydroxy+epoxy groups)/(blocked+unblocked isocyanate groups) being from 0.9 to 1.1 and the composition comprising the nanoscale solid particles, without surface modification, in an amount of from 10% to 30% by weight, based on a solids content of the composition.

29. The composition of claim 28, wherein the polycondensates comprise epoxy groups.

30. The composition of claim 28, wherein the nanoscale solid particles comprise one or more of $SiO_2$, $Al_2O_3$, ITO, ATO, AlOOH, $Ta_2O_5$, $ZrO_2$ and $TiO_2$.

31. The composition of claim 30, wherein the composition comprises at least one of a blocked isocyanatosilane and a condensate thereof.

32. A process for producing a coated substrate, wherein the process comprises applying the composition of claim 1 onto the substrate and curing the coating composition to form bonds between the groups having active hydrogen on the surface of the nanoparticles and the isocyanate groups, thereby crosslinking the nanoparticles, provided that when blocked isocyanate groups are present in the composition, blocked isocyanate groups are deblocked at least one of before and during curing of the composition, and provided that when precursor groups of groups having an active hydrogen are present in the composition, precursor groups are converted to groups having an active hydrogen at least one of before and during curing of the composition.

33. A process for producing a molded body from the composition of claim 1, wherein the process comprises placing the composition in a mold and curing the composition to form bonds between the groups having active hydrogen on the surface of the nanoparticles and the isocyanate groups, thereby crosslinking the nanoparticles, provided that when blocked isocyanate groups are present in the composition, blocked isocyanate groups are deblocked at least one of before and during curing of the composition, and provided that when precursor groups of groups having an active hydrogen are present in the composition, precursor groups are converted to groups having an active hydrogen at least one of before and during curing of the composition.

34. The composition of claim 1, wherein the isocyanatosilane comprises at least one of a hydrolyzable silane having an isocyanate group on a non-hydrolyzable radical and a condensate thereof.

35. The composition of claim 34, wherein the hydrolysable silane comprises at least one silane of formula $$Ri(R)_b SiX_{(3-b)}$$

in which the radical Ri represents a non-hydrolyzable substituent which has an isocyanate group, the radicals R are the same or different and are non-hydrolyzable substituents different from Ri, the radicals X are the same or different and are hydrolyzable groups or hydroxyl groups, and b is 0,1 or 2.

36. The composition of claim 35, wherein R represents an alkyl group having from 1 to 10 carbon atoms, Ri represents an alkyl group having from 1 to 10 carbon atoms substituted by an isocyanate group, and X represents an alkoxy group having from 1 to 10 carbon atoms.

37. The composition of claim 1, wherein the isocyanatosilane comprises at least one of 3-isocyanatopropyltri(m)ethoxysilane, 3-isocyanatopropyldimethylchlorosilane, and a condensate thereof.

38. The composition of claim 34, wherein the isocyanatosilane comprises a blocked isocyanatosilane.

39. The composition of claim 28, wherein the isocyanatosilane comprises at least one of a hydrolyzable silane having an isocyanate group on a non-hydrolyzable radical and a condensate thereof.

* * * * *